US006916142B2

(12) United States Patent
Hansen et al.

(10) Patent No.: US 6,916,142 B2
(45) Date of Patent: Jul. 12, 2005

(54) UTILITY VEHICLES

(75) Inventors: Loren F. Hansen, Lincoln, NE (US); Stephanie L. Homewood, Newport News, VA (US); Thomas J. Deves, Evans, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/199,929

(22) Filed: Jul. 19, 2002

(65) Prior Publication Data

US 2004/0013489 A1 Jan. 22, 2004

(51) Int. Cl.$^7$ .............................. B60P 1/16; B60P 1/64
(52) U.S. Cl. ...................... 410/77; 298/17 T; 298/17 R
(58) Field of Search .................. 410/80, 77; 298/17 R, 298/22 R, 17 T; 226/35.1, 35.3, 183, 184; 276/183.2, 184.1; 224/42.11, 42.32, 42.38, 42.4, 401, 274, 280, 282, 484, 485, 567

(56) References Cited

U.S. PATENT DOCUMENTS

| | | | | |
|---|---|---|---|---|
| RE22,955 E | * | 12/1947 | Penney | 298/22 R |
| 3,647,097 A | * | 3/1972 | Skaggs | 298/17 R |
| 3,790,090 A | * | 2/1974 | Lorenc et al. | 239/666 |
| 3,833,261 A | * | 9/1974 | Dingler | 298/1 A |
| 3,883,020 A | * | 5/1975 | Dehn | 298/17 R |
| 4,019,781 A | * | 4/1977 | Ray | 298/22 J |
| 4,207,022 A | * | 6/1980 | Castel | 414/685 |
| 4,317,592 A | * | 3/1982 | Newman et al. | 298/7 |
| 4,583,693 A | * | 4/1986 | Harder | 239/657 |
| 4,596,347 A | * | 6/1986 | Hite | 298/17 T |
| 4,642,007 A | * | 2/1987 | Marshall et al. | 410/80 |
| 4,969,690 A | * | 11/1990 | Smith | 298/17 R |
| 5,137,366 A | * | 8/1992 | Hill et al. | 366/47 |
| 5,267,780 A | | 12/1993 | Friesen et al. | |
| 5,337,849 A | | 8/1994 | Eavenson, Sr. et al. | |
| 5,456,520 A | * | 10/1995 | Adams et al. | 298/22 R |

(Continued)

OTHER PUBLICATIONS

John Deere, "1800 Utility Vehicle," Product Literature, 1998 Edition, 7 pages.
John Deere, "Gator Utility Vehicles," Product Literature, 1998 Edition, 11 pages.
John Deere, "Gator Utility Vehicles" Product Literature, 1999 Edition, 15 pages.
John Deere, "New Attachments Available For Progator® Utility Vehicle," Marketing Information Bulletin, Jan. 7, 2002, 2 pages.

*Primary Examiner*—H. Gutman
(74) *Attorney, Agent, or Firm*—Bell, Boyd & Lloyd, LLC (57) ABSTRACT

A utility vehicle for removably mounting and carrying a plurality of different equipment, such as turf maintenance equipment, is provided. The utility vehicle is motorized and has a support frame. A multi-purpose platform is mounted to the support frame. The multi-purpose platform has a plurality of different equipment mounts so configured and arranged to removably mount the plurality of different equipment to the multi-purpose platform. A hydraulic lifting mechanism pivots the multi-purpose platform upward while the equipment is mounted to the multi-purpose platform to provide access to the area of the vehicle underneath the multi-purpose platform.

37 Claims, 8 Drawing Sheets

U.S. PATENT DOCUMENTS

| | | | | |
|---|---|---|---|---|
| 5,476,146 A | * | 12/1995 | Brown | 169/24 |
| 5,509,710 A | * | 4/1996 | Eavenson et al. | 269/19 |
| 5,513,869 A | * | 5/1996 | Putnam | 280/415.1 |
| 5,571,270 A | * | 11/1996 | Larkin | 280/491.1 |
| 5,573,300 A | | 11/1996 | Simmons | |
| 5,573,360 A | * | 11/1996 | Bennett | 410/77 |
| 5,580,211 A | * | 12/1996 | Mengel | 298/22 R |
| 5,609,451 A | * | 3/1997 | McCorkle, Jr. | 410/77 |
| 5,738,479 A | * | 4/1998 | Glen et al. | 410/77 |
| 5,788,310 A | * | 8/1998 | McKee | 410/80 |
| 6,029,750 A | * | 2/2000 | Carrier | 169/52 |
| 6,036,275 A | | 3/2000 | Hansen et al. | |
| 6,092,966 A | * | 7/2000 | Martin et al. | 298/22 P |
| 6,394,555 B2 | * | 5/2002 | Mizuta et al. | 298/38 |
| 6,543,856 B2 | * | 4/2003 | Jones | 298/22 R |
| 6,616,207 B2 | | 9/2003 | Mizuta | |
| 6,659,566 B2 | * | 12/2003 | Bombardier | 298/22 R |
| 6,688,418 B2 | | 2/2004 | Bohrer | |
| 6,695,566 B2 | * | 2/2004 | Rodriguez Navio | 414/538 |
| 2002/0190565 A1 | * | 12/2002 | Libler et al. | 298/17 R |

* cited by examiner

UTILITY VEHICLES

CROSS REFERENCE TO RELATED APPLICATION

This application is related to the following commonly owned co-pending patent application: "Multi-Function Utility Vehicle" filed on Aug. 14, 2002, published on Feb. 19, 2004 having U.S. Patent Application Publication No. 10/218,983.

BACKGROUND OF THE INVENTION

The present invention generally pertains to utility vehicles. More specifically, the present invention pertains to utility vehicles having a multi-purpose platform for mounting different attachments to be carried by the vehicles. The present invention also pertains to multi-purpose platforms for utility vehicles in which the platforms can be easily raised and lowered while an attachment remains mounted to the platform. The present invention further pertains to methods relating to the utility vehicles and multi-purpose platforms. The present invention can be used, for example, as a turf maintenance utility vehicle.

Small, motorized utility vehicles, such as John Deere utility vehicles, are widely known and commonly used for a wide variety of purposes. These types of utility vehicles have been used for turf maintenance and other purposes. The utility vehicles typically are highly maneuverable, equipped to operate over a low speed range, and cause minimal turf damage. Turf maintenance can include various different activities, for example, spreading, spraying, and vacuuming. Existing turf maintenance utility vehicles are outfitted with the appropriate equipment to perform the desired turf maintenance activity, for example, spreader equipment, sprayer equipment, or vacuum equipment. The desired turf maintenance equipment is mounted to a vehicle frame behind the vehicle's operator control area.

However, each turf maintenance equipment has included its own mounting bed or mounting frame for attachment to the vehicle frame. When the turf maintenance equipment mounted on a utility vehicle is to be changed to perform a different maintenance activity, the equipment mounting bed or mounting frame is removed from the vehicle. The next maintenance equipment with its own mounting bed or mounting frame is then attached to the rear of the utility vehicle. The existing utility vehicles have not included a multi-purpose platform attached to the vehicle frame in which the multi-purpose platform can be used to mount different equipment, such as turf maintenance equipment or other equipment, to the vehicle.

One turf maintenance equipment used on the utility vehicles is a VICON™ spreader. The VICON™ product, which is commercially available through the assignee of the present invention, includes a spreader pulled by a vehicle. The spreader has a material holder which holds dry material, and spreading mechanism distributes the dry material to the turf or ground. The VICON™ spreader spreads dry material, such as sand or fertilizer, onto the turf as the vehicle is driven over the turf. The VICON™ spreader has been mounted to utility vehicles via a bed that is mounted the vehicle frame. The bed is mounted to the vehicle frame and then the spreader is mounted to the top of the bed by bolts and nuts. If the utility vehicle is to be used for an activity other than spreading, the spreader is unbolted from the bed and removed from the bed. Then, the bed is dismounted and removed from the frame. Next, the new equipment and its mounting bed or mounting frame are mounted to the frame of the utility vehicle. Removing the spreader bed in addition to the spreader is time consuming, can be difficult, and requires the ability to lift and handle heavy loads. Also, bolting and unbolting the spreader to the spreader bed is cumbersome and requires significant time and effort. Further, use of an additional mounting bed or mounting framework for the next equipment increases the difficulty, time, and effort to change equipment, and increases equipment costs.

The spreader bed has been mounted to the rear end of the vehicle frame at pivot points. The pivot mount allows the spreader and the spreader bed to be pivoted upward, although with great difficulty, to provide access to the vehicle area underneath the spreader bed. The bed and spreader are manually lifted upward because the vehicle accessory hydraulic system is connected to the spreader rate control mechanism to operate the spreader. The vehicle accessory hydraulic system is not available to operate a hydraulic lift cylinder which may be underneath the bed and typically used to raise and lower a cargo bed attachment. Manually raising and lowering the spreader bed and spreader can be rather difficult because of the weight of the spreader and bed and any material in the spreader hopper. Usually, the spreader must be removed from the bed before the bed can be manually raised for service of the utility vehicle.

Accordingly, needs exist to improve utility vehicles because of the reasons mentioned above. Needs also exist to improve utility vehicles for other reasons. For example, the popularity and usefulness of the utility vehicles results in needs to improve such vehicles. Enhancing versatility and reducing costs of the utility vehicles are also desirable.

SUMMARY OF THE INVENTION

The present invention provides new utility vehicles. The improved utility vehicles have multi-purpose platforms for mounting different attachments or equipment to the vehicles. The present invention also provides, of course, new multi-purpose platforms for utility vehicles. The new utility vehicles and multi-purpose platforms enhance the functionality and versatility of utility vehicles by allowing each utility vehicle to carry different equipment and be used for different purposes or activities. For example, the new utility vehicles and multi-purpose platforms can be used to carry different turf maintenance equipment or other types of equipment and to perform the activities associated with that equipment.

In an embodiment, the present invention is directed to a utility vehicle for removably mounting and carrying a plurality of different equipment. The utility vehicle includes a motorized vehicle having a support frame and a multi-purpose platform mounted to the support frame. The multi-purpose platform has a plurality of different equipment mounts so configured and arranged to removably mount the plurality of different equipment to the multi-purpose platform.

The multi-purpose platform may be pivotally mounted at one end to the support frame. The utility vehicle may also include a platform lifting mechanism, such as a hydraulic cylinder, connected to the motorized vehicle and to the multi-purpose platform. The platform lifting mechanism can move the multi-purpose platform to an upward position and expose a vehicle area underneath the multi-purpose platform. A platform securing latch may be provided to secure the platform in a downward position on the vehicle support frame.

The plurality of different equipment mounts of the multi-purpose platform may include a spreader equipment mount, for example to mount the VICON™ spreader, and a tow hitch, for example. The tow hitch may be positioned in a downward recessed portion of the multi-purpose platform.

In another embodiment, the present invention provides a method of operating a utility vehicle. The method includes the steps of mounting a first equipment to a multi-purpose platform of the utility vehicle, dismounting the first equipment from the multi-purpose platform, and mounting a second equipment different from the first equipment to the same multi-purpose platform after dismounting the first equipment.

The method of operating a utility vehicle may also include the step of hydraulically pivoting the multi-platform upward while one of the first and second equipment is mounted to the multi-purpose platform.

An advantage of the present invention is to provide improved utility vehicles.

Another advantage of the present invention is to provide multi-purpose platforms for utility vehicles.

A further advantage of the present invention is to allow different equipment to be mounted to a multi-purpose platform on a utility vehicle.

Yet another advantage of the present invention is to provide a utility vehicle with a multi-purpose platform that can be easily lifted upward to expose the area of the vehicle underneath the platform.

An even further advantage of the present invention is to use a single utility vehicle to alternatively carry different equipment and perform different activities.

Additional features and advantages of the present invention are described in, and will be apparent from, the following Detailed Description of the Invention and the figures.

DETAILED DESCRIPTION OF THE INVENTION

The present invention generally pertains to utility vehicles. More specifically, the present invention pertains to utility vehicles having a multi-purpose platform for mounting different attachments or equipment to be carried by the vehicles.

The present invention also pertains to multi-purpose platforms for utility vehicles in which the platforms can be easily raised and lowered while an attachment remains mounted to the platform. The present invention further pertains to methods relating to the utility vehicles and multi-purpose platforms. The present invention can be used, for example, as a turf maintenance utility vehicle. However, the present invention can be embodied in many different forms.

Figure 1:
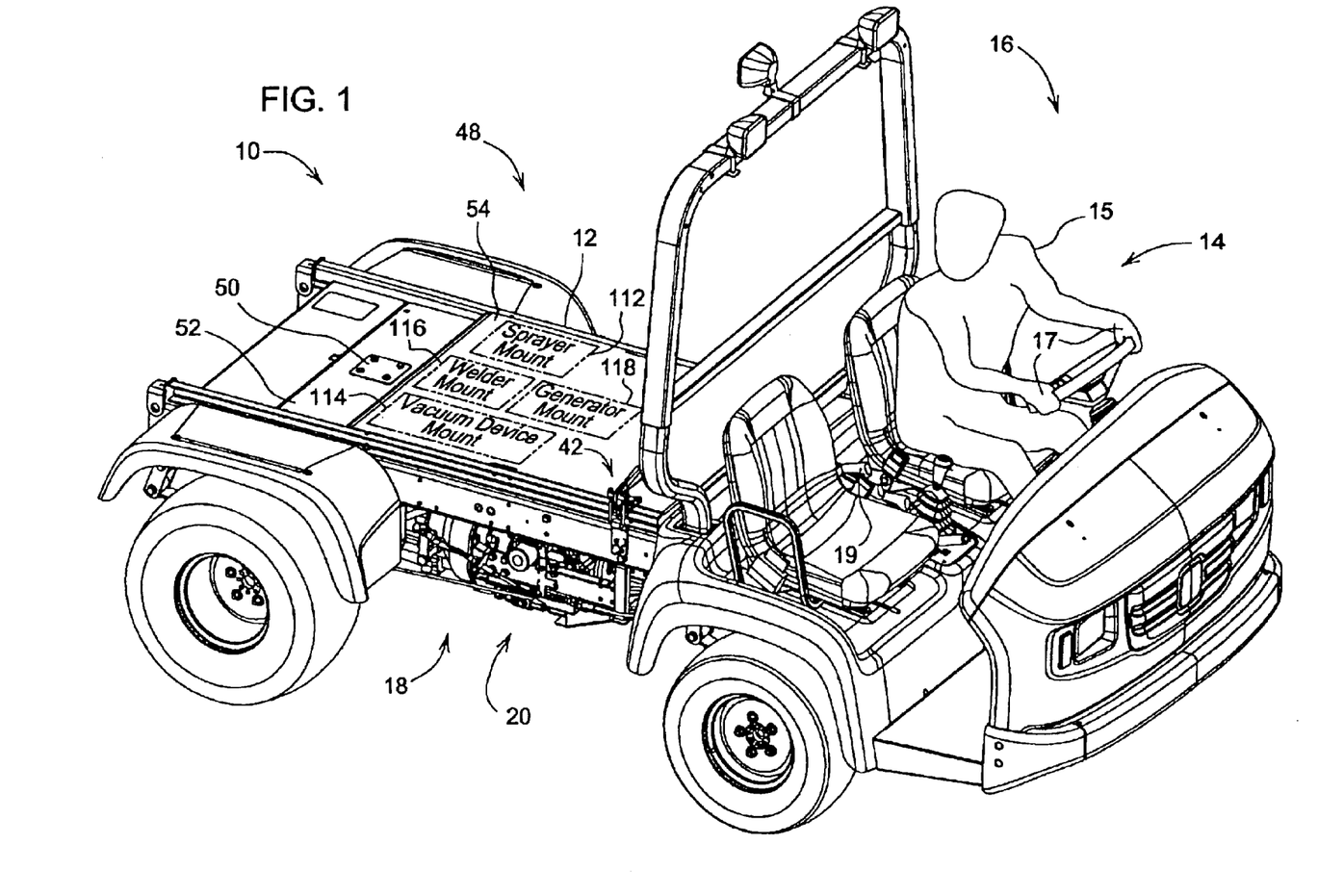
FIG. 1 is a front perspective view of a utility vehicle having a multi-purpose platform according to the present invention.
Figure 2:
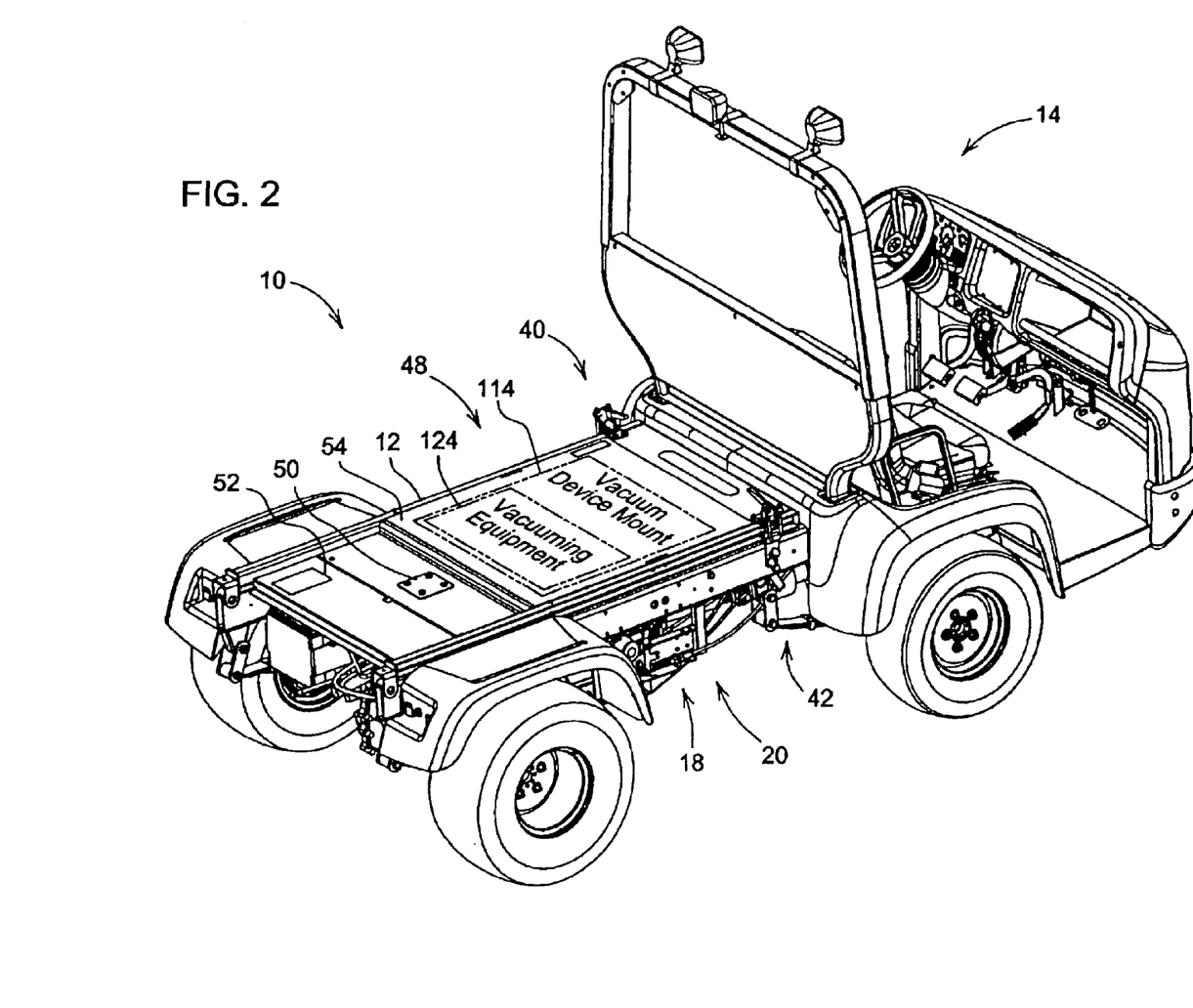
FIG. 2 is a rear perspective view of the utility vehicle having a multi-purpose platform of FIG. 1.

FIGS. 1 and 2 show a utility vehicle 10 having a multi-purpose platform 12 according to the principles of the present invention. The utility vehicle 10 can be based on a John Deere utility vehicle, such as the highly regarded John Deere PROGATOR™ vehicle, for example. The John Deere PROGATOR™ includes a series of utility vehicles manufactured by the assignee of the present invention. These utility vehicles include a chassis or frame; a plurality of wheels rotatably connected to the frame including a set of front wheels positioned along an axis and at least one set of rear wheels positioned along another axis; a motor, engine or power source supported by the frame and, in some cases, positioned between the axis of the front wheels and the axis of the rear wheels; a transmission which operatively couples the power source to a plurality of the wheels; a plurality of seats mounted to the frame; a bed or platform mounted to the frame (in some cases behind the seats and above the power source); an electrical system coupled to the engine; a set of head lights connected to the electrical system; a battery connected to the electrical system and other components.

These utility vehicles are small-sized vehicles which operate at relatively low speeds, such as less than thirty miles per hour. These small-sized vehicles are operable on pavement and non-pavement or off-road driving surfaces for duty-specific tasks. For example, these vehicles are operable for hauling cargo over various driving surfaces, maintaining golf courses and other grounds, making repairs, ground care and other utility-related purposes. Of course, other utility vehicles can be constructed according to the present invention.

The utility vehicle 10 has an operator cab area 14 for an operator 15, which can be covered or uncovered, at a front end 16 of the vehicle 10. The operator cab area 14 contains various controls for operating the utility vehicle 10. Controls for operating equipment mounted to the multi-purpose platform 12 may also be provided in the operator cab area 14 for use by the hands 17 of the operator 15. For example, equipment controls may include hydraulic controls (such as an input or control device 19) of a hydraulic system connected to the equipment mounted to the multi-purpose platform 12 for operating the equipment.

The utility vehicle 10 is power driven and has an engine 18 with associated components located behind the operator cab area 14 in a lower, engine compartment area 20 of the vehicle 10. The multi-purpose platform 12 is also positioned behind the operator cab area 14 and covers the engine compartment area 20. The engine compartment area 20 may also contain various other vehicle components and systems, for example, hydraulic system components and transmission components.

Figure 3:
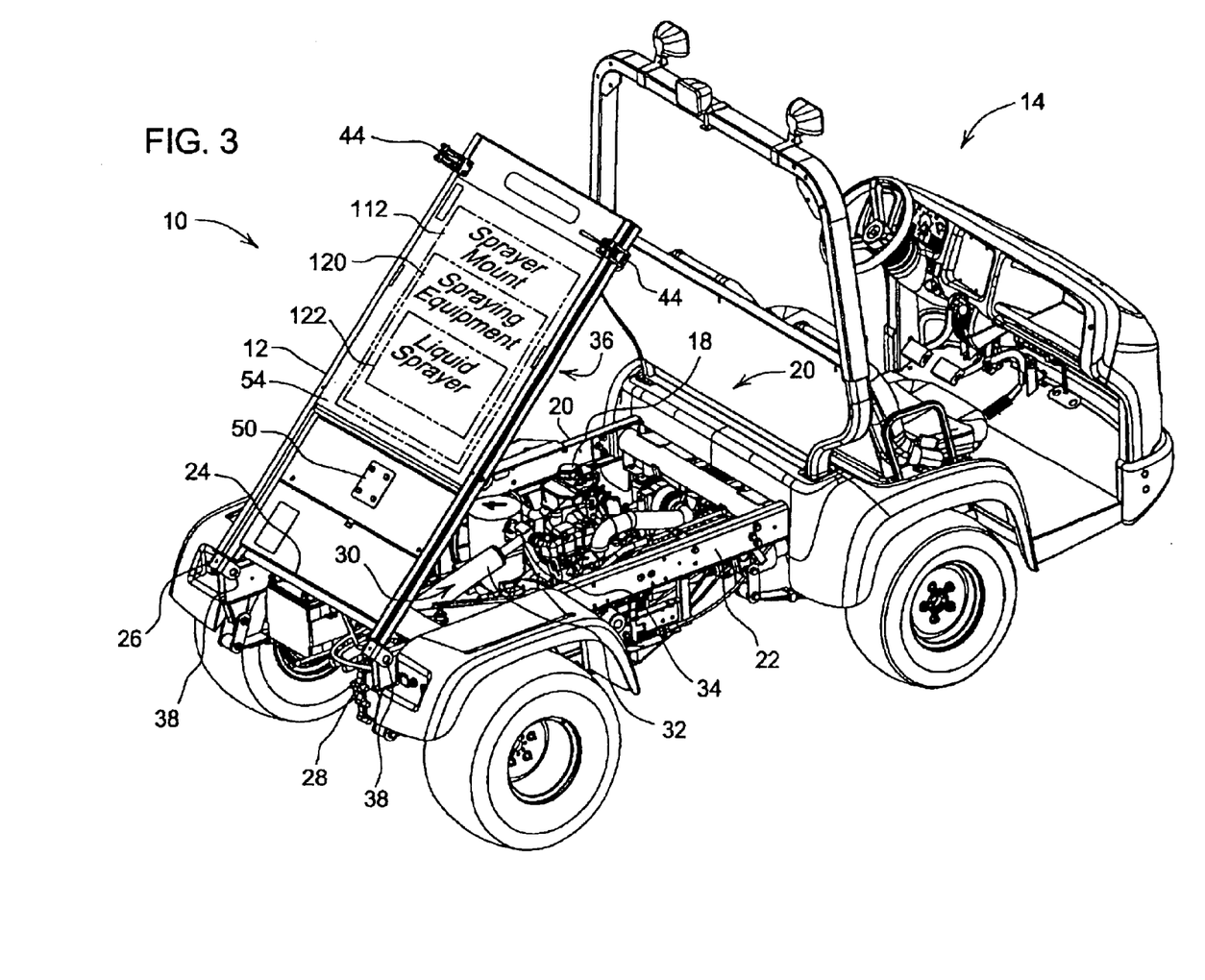
FIG. 3 is a rear perspective view of the utility vehicle of FIG. 2 showing the multi-purpose platform in a raised position.

Referring also to FIG. 3, the multi-purpose platform 12 is pivotally mounted to a support frame 22 of the utility vehicle 10. The multi-purpose platform 12 has a rear frame mounting end 24 which is pivotally mounted to the support frame 22 at left and right pivot mounts or hinges 26, 28. A platform lifting mechanism 30, such as a hydraulic cylinder 32, lifts and lowers the multi-purpose platform 12 to expose and cover the engine compartment area 20. The multi-purpose platform 12 can be raised to an upward position as shown in FIG. 3 to easily provide access to the engine compartment area 20 underneath the multi-purpose platform 12. One may desire access to the engine compartment area 20 underneath the multi-purpose platform 12 to service or repair the utility vehicle 10, for example. The platform lifting mechanism 30 allows the multi-purpose platform 12 to be raised while equipment remains mounted to the multi-purpose platform 12. Otherwise, without the platform lifting mechanism 30, the equipment would need to be removed or dismounted from the multi-purpose platform 12 to reduce the weight being lifted and increase safety during manual lifting.

The example of the platform lifting mechanism 30 shown in FIG. 3 is the hydraulic cylinder 32. The hydraulic cylinder 32 is shown partially disconnected from its operating position. An end 34 of the hydraulic cylinder 32 is shown disconnected from the multi-purpose platform 12. However, the hydraulic cylinder end 34 is connected to the bottom 36 of the multi-purpose platform 12 during use. A pivot mount having a pivot pin can be used to attach the hydraulic cylinder end 34 to the multi-purpose platform 12. Another end of the hydraulic cylinder 32 opposite the end 34 is connected to the support frame 22 of the utility vehicle 10. A hydraulic fluid system is fluidly connected to the hydraulic cylinder 32 and has a control located in the operator cab area 14 for actuating the platform lifting mechanism 30.

The multi-purpose platform 12 can be removably mounted to the vehicle support frame 22. For example, each one of the left and right pivot mounts 26, 28 has a pivot pin 38 which can be removed to disconnect the rear end 24 of the multi-purpose platform 12 from the support frame 22. Also, the end 34 of the hydraulic cylinder 32 can be disconnected from the multi-purpose platform 12. The multi-purpose platform 12 can then be removed from the utility vehicle 10.

Still referring to FIGS. 1–3, the utility vehicle 10 may also include one or more securing latches 40, 42. The securing latches 40, 42 lock the multi-purpose platform 12 in its downward position on top of the support frame 22 as shown in FIGS. 1 and 2. The securing latches 40, 42 can be unlatched to allow the multi-purpose platform 12 to be raised to its upward position (FIG. 3). One securing latch according to the present invention has a latch actuator 44 connected to the multi-purpose platform 12 and a latch hook 46 (FIG. 4) connected to the support frame. The latch actuator 44 engages the latch hook 46 to lock the multi-purpose platform 12 in position.

The multi-purpose platform 12 is designed to receive a plurality of different attachments or equipment to be carried by the utility vehicle 10. More specifically, the multi-purpose platform 12 may provide a plurality of different equipment mounts 48 suitable for mounting the equipment to the multi-purpose platform 12. The plurality of different equipment mounts 48 can be separate individual mounts and/or a universal or modular type mount capable of mounting more than one attachment or equipment, for example. Also, each equipment mount 48 can be permanently connected to the multi-purpose platform 12 or removably connected to the multi-purpose platform 12. Examples of the equipment mounts 48 for the multi-purpose platform include, but are not limited to, sprayer mounts (such as sprayer mount 112) for mounting spraying equipment 120 such as liquid sprayers, 122, spreader mounts for dry material spreaders, vacuum device mounts (such as vacuum device mount 114) for mounting vacuuming equipment 124 towing hitches, such as the so-called "fifth wheel ball," welder mounts (such as welder mount 116), generator mounts (such as generator mount 118), cargo boxes or containers, and the like.

The equipment mounts 48 are configured or designed to removably mount the equipment to the multi-purpose platform 12. Also, the equipment mounts 48 are arranged or positioned on the multi-purpose platform 12 so that the multi-purpose platform can include multiple different equipment mounts to mount the different equipment. Depending on the equipment and the corresponding equipment mounts, only one equipment at a time may be mounted to the multi-purpose platform 12 or more than one equipment may be mounted to the multi-purpose platform at the same time.

The equipment mounts 48 are, of course, designed to include the appropriate mounting structure to cooperate with the desired equipment to be mounted to the multi-purpose platform 12. For example, the equipment mounts 48 may include mounting brackets or structures, bolt hole patterns, vibration dampeners, etc.

One example of an equipment mount 48 is shown in FIGS. 1–3. The multi-purpose platform 12 includes a tow hitch mount 50 for a commonly referred to "fifth wheel ball" 110. The tow hitch mount 50 allows the fifth wheel ball 110 to be removably mounted, such as bolted, to the multi-purpose platform 12. The tow hitch mount 50 is shown as a 4-hole bolt pattern for bolting to the fifth wheel ball 110. The tow hitch mount 50 and the fifth wheel ball 110 provide a convenient mechanism to tow trailers and other equipment behind the utility vehicle 10.

The tow hitch mount 50 is positioned generally along a front-to-rear centerline of the multi-purpose platform 12. Locating the tow hitch mount 50 along the centerline enhances stability of the utility vehicle 10 when towing equipment, e.g., sideways forces are reduced or eliminated when towing. Also, the multi-purpose platform 12 can have a recessed portion 52 for the tow hitch mount 50. The recessed portion 52 is recessed downward from an upper surface 54 of the multi-purpose platform 12 and lowers the height of the fifth wheel ball 110. The recessed tow hitch mount 50 and the lowered height of the fifth wheel ball 110 enhances the towing ability of the utility vehicle 10. For example, the utility vehicle 10 can tow a greater variety of attachments compared to a fifth wheel ball 110 that is mounted at a greater height.

Figure 5:
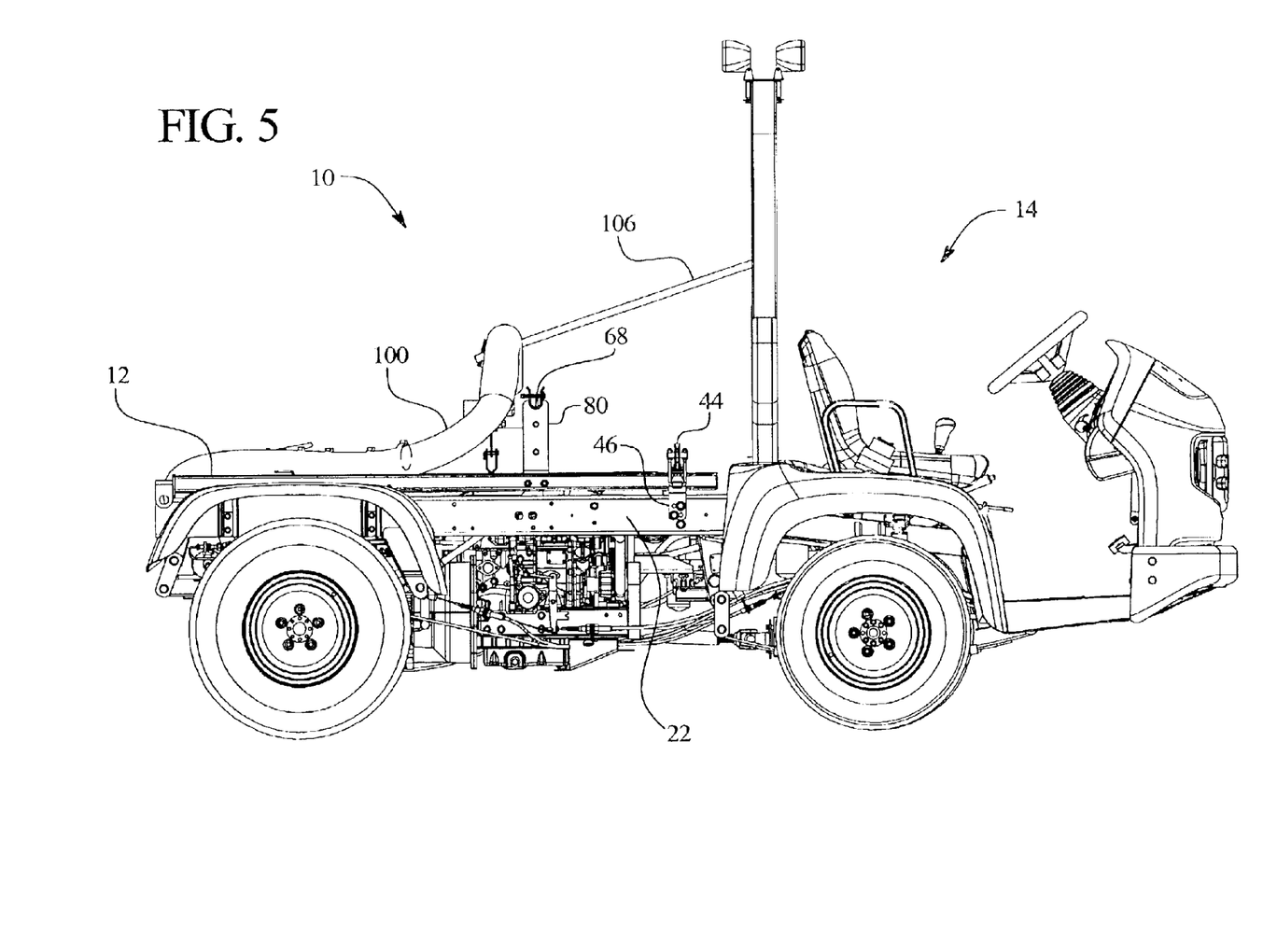
FIG. 5 is a side elevational view of the utility vehicle of FIG. 1 having a spreader mount on the multi-purpose platform.
Figure 6:
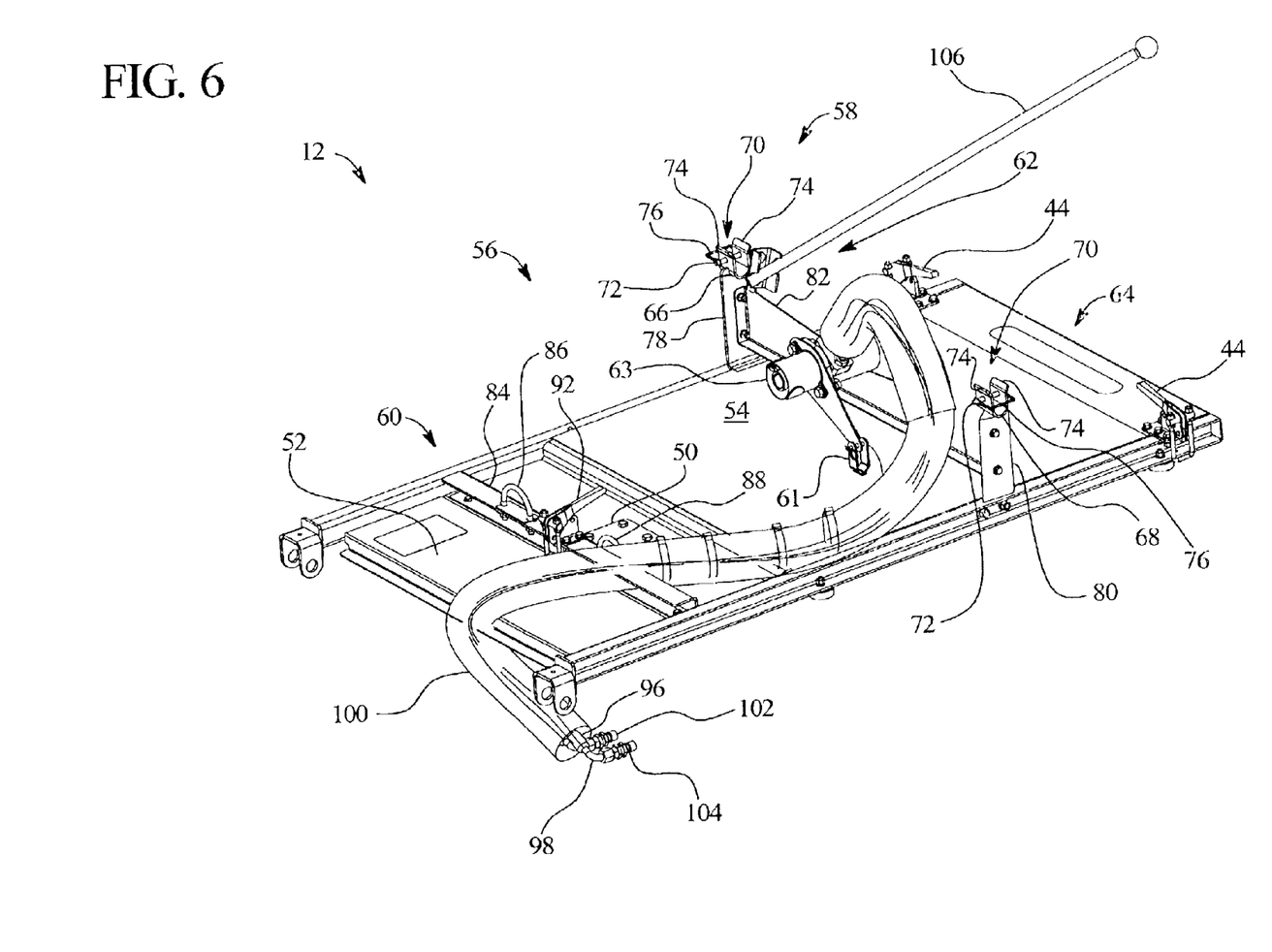
FIG. 6 is a perspective view of the spreader mount and the multi-purpose platform of FIG. 5.
Figure 7:
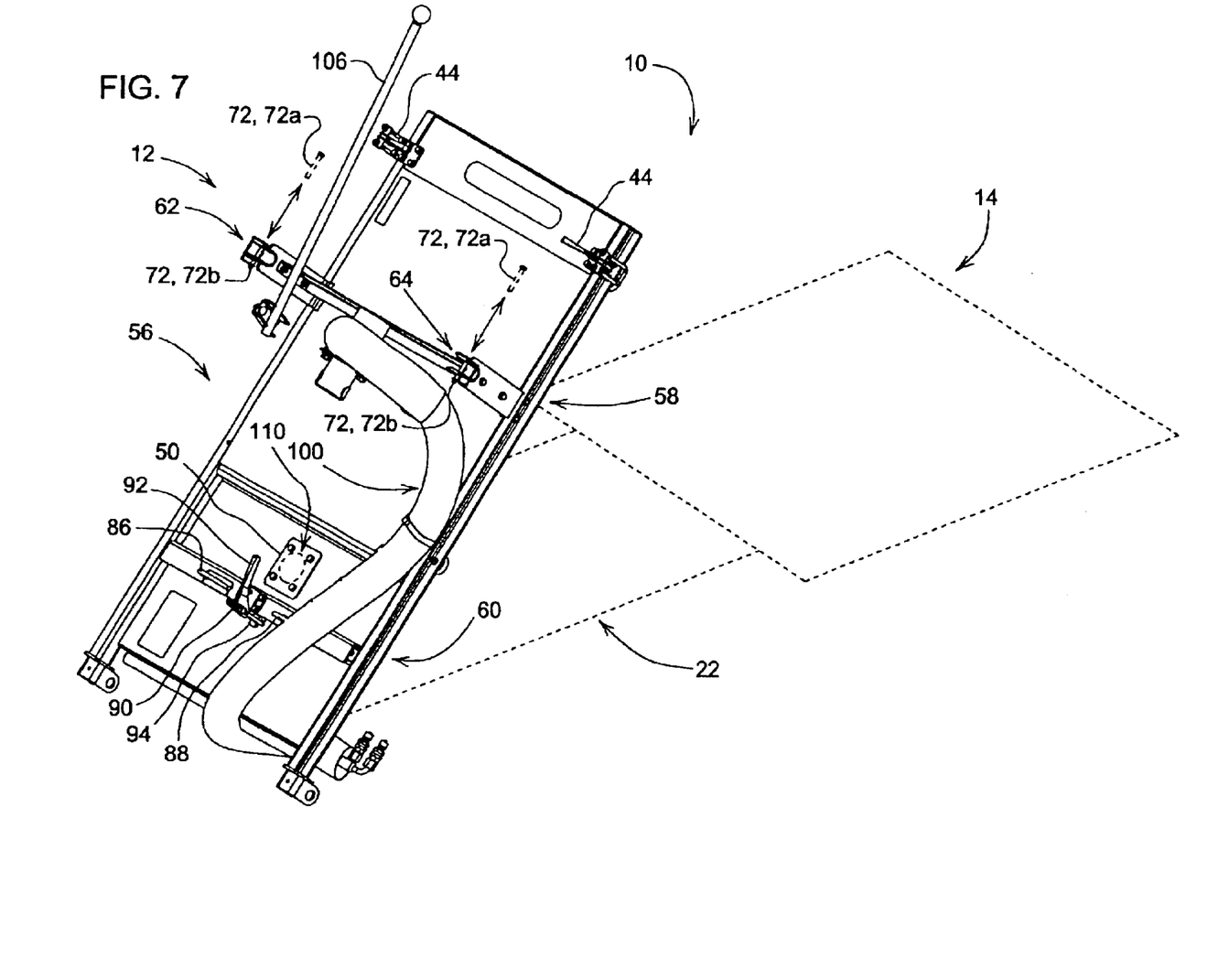
FIG. 7 is another perspective view of the spreader mount and the multi-purpose platform of FIG. 5.
Figure 8:
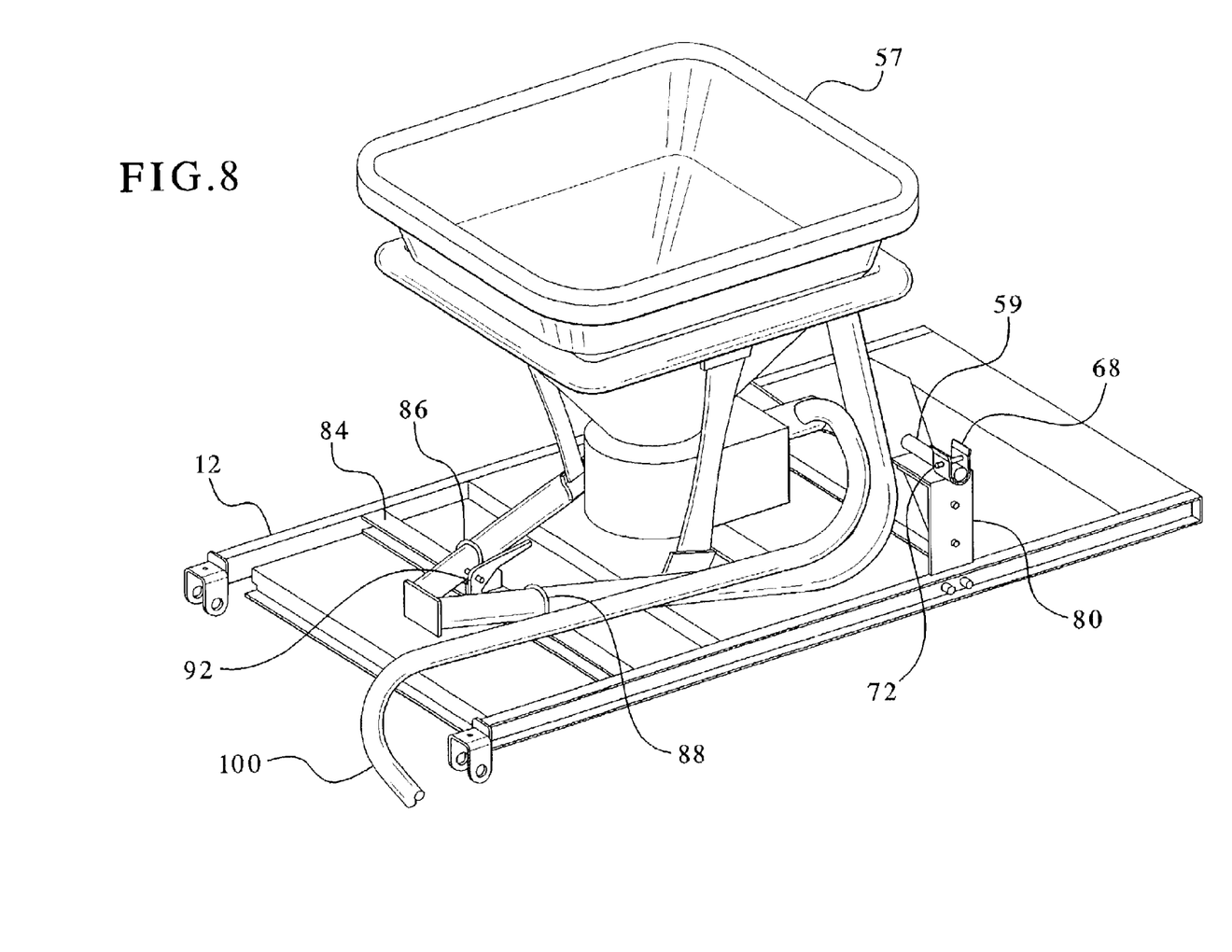
FIG. 8 is a perspective view of an equipment mounted to the multi-purpose platform.

Referring to FIGS. 5–8, another equipment mount 48 on the multi-purpose platform 12 is shown. The equipment mount 48 shown in FIGS. 5–7 is one example of a spreader mount 56. The spreader mount 56 is particularly designed for mounting a VICON™ spreader to the utility vehicle 10. The VICON™ spreader can be used to spread dry material, such as fertilizers, weed killers, or sand over turf or ground terrain. FIG. 8 shows the VICON™ spreader 57 mounted to the multi-purpose platform 12 by the mount 56. The spreader discharge applicator is omitted from FIG. 8 to more clearly illustrate the multi-purpose platform 12. Although the mount 56 is described as a spreader mount for the VICON™ spreader 57, the spreader mount 56 is a universal mounting system. The mount 56 can be used to mount a wide variety of attachments or equipment to the multi-purpose platform 12.

The spreader mount 56 includes a forward mount portion 58 and a rearward mount portion 58 and a rearward mount portion 60. The forward mount portion 58 includes first and second forward mounting points 62, 64, such as first and second U-shaped brackets 66, 68. Each U-shaped bracket 66, 68 has an open end 70 facing upward. A removable pin 72 extends between the two legs 74, 74 of each U-shaped bracket 66, 68. The pin 72 is movable from a disengaged or removed position 72a to an engaged or installed position 72b. A portion 59 of the spreader 57 rests in each of the U-shaped brackets 66, 68 and the pins 72 are inserted through holes in the bracket legs 74, 74 to secure the spreader 57 to the forward mount portion 58 of the spreader mount 56 as shown in FIG. 8. The pins 72 can be secured in place by a pin retaining member 76 as shown in FIG. 6. If the spreader 57, or any other attachment or equipment, does not have a portion which fits into or aligns with the forward and rearward mount portions 58, 60, then an appropriate adapter can be utilized, such as the portion 59 shown in FIG. 8.

The U-shaped brackets 66, 68 are connected to uprights 78, 80 to raise the position of the U-shaped brackets 66, 68 above the top surface 54 of the multi-purpose platform 12. The uprights 78, 80 can be removably or permanently connected to the multi-purpose platform 12. A cross-brace 82 can extend from one upright 78 or U-shaped bracket 66 to the other upright 80 or U-shaped bracket 68 for increased strength of the forward mount portion 58.

Figure 4:
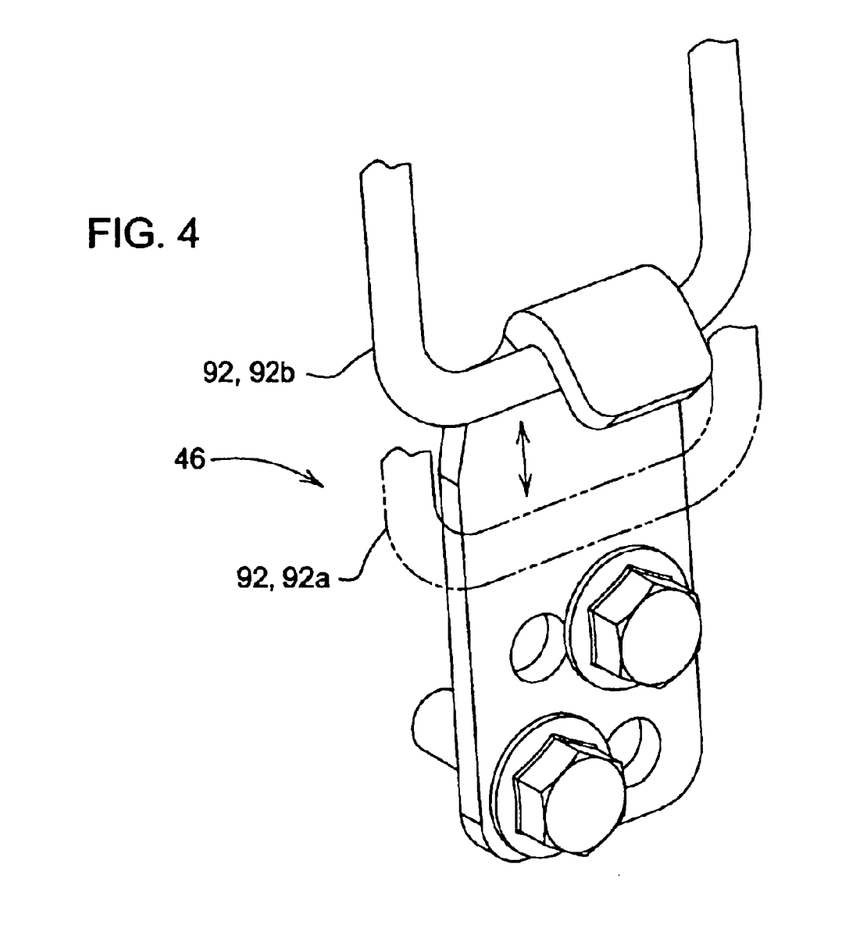
FIG. 4 is a perspective view of a latch hook of a securing latch of the multi-purpose platform.

The rearward mount portion 60 of the spreader mount 56 includes a mounting bar 84 for mounting a portion of the spreader to the multi-purpose platform 12. The mounting bar 84 can be attached to the spreader by first and second U-shaped bolts 86, 88, for example. A rearward mounting point 90, such as a latch actuator 92 and a latch hook 94 connected to the multi-purpose platform 12 (such as the latch hook 46 shown in FIG. 4) can be used to secure the mounting bar 84 to the multi-purpose platform 12. As illustrated in FIG. 4, the latch actuator 92 is movable from a disengaged position 92a to an engaged position 92b. Advantageously, the mounting bar remains connected to the spreader 57 when the spreader 57 is dismounted from the multi-purpose platform 12.

Accordingly, the spreader 57 is easily mounted to the multi-purpose platform 12 by mounting the spreader 57 to the forward mounting points 62, 64 and latching the rearward mounting point 90. Additional mounting points may also be provided, if desired. For example, FIG. 6 shows another mounting point 61, in the form of a U-shaped bracket or pin, for supporting the rate control mechanism 63 of the spreader 57.

FIGS. 5–8 also show some additional items related to the spreader 57. First and second hydraulic lines 96, 98 extend through a protective cover or tube 100. The hydraulic lines 96, 98 connect to the hydraulic system of the utility vehicle 10 at hydraulic connections 102, 104. Hydraulic connections at the opposite end of the hydraulic lines connect to the spreader 57 for spreader operation. An actuator arm 106 extends from the spreader to the operator cab area 14 also for spreader operation.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A motorized utility vehicle for removably mounting a plurality of different types of equipment, at least one of the types of equipment having a shape different from a shape of another one of the types of equipment, the motorized utility vehicle comprising:

a support frame;

an engine supported by the support frame;

a multi-purpose platform pivotally mounted to the support frame, the multi-purpose platform having a plurality of different equipment mounts, at least one of the equipment mounts having a different shape, one of the equipment mounts connectable to one of the types of equipment and another one of the equipment mounts connectable to another one of the types of equipment;

at least one platform lifting mechanism having a first end and a second end, the first end operatively coupled to the support frame and the second end operatively coupled to the multi-purpose platform; and at least one control device supported by the support frame, the control device operatively coupled to the platform lifting mechanism, the control device operable to cause the platform lifting mechanism to move the multi-purpose platform between: (a) a first position where the multi-purpose platform covers at least a portion of the engine; and (b) a second position where said portion of the engine is exposed.

2. The utility vehicle of claim 1, wherein the multi-purpose platform has an end or a side which is pivotally mounted to the support frame.

3. The utility vehicle of claim 2, wherein the platform lifting mechanism includes a hydraulic device operable to produce a force sufficient to move the multi-purpose platform from the first position to the second position while at least one of the types of equipment is mounted on the multi-purpose platform.

4. The utility vehicle of claim 2, further comprising a platform securing latch connected to the multi-purpose platform and to the motorized vehicle.

5. The utility vehicle of claim 1, wherein the multi-purpose platform is removably mounted to the support frame.

6. The utility vehicle of claim 1, wherein the plurality of different equipment mounts further comprises a mount having a forward mount portion having first and second mounting points, and a rearward mount portion.

7. The utility vehicle of claim 6, wherein
the forward mount portion further comprises first and second U-shaped brackets, each U-shaped bracket having an open end facing upward and a removable pin extending from one leg to another leg of the U-shaped bracket, and
the rearward mount portion further comprises a bar removably latched to the multi-purpose platform.

8. The utility vehicle of claim 1, wherein the plurality of different equipment mounts include a mount selected from the group consisting of a tow hitch mount operable to couple the multi-purpose platform to equipment pulled by the motorized utility vehicle and a turf maintenance equipment mount operable to coupled the multi-purpose platform to at least one type of turf maintenance equipment carried on the multi-purpose platform.

9. The utility vehicle of claim 8, wherein the multi-purpose platform further comprises a downward recessed portion having the tow hitch mount.

10. A motorized utility vehicle for removably mounting a plurality of different types of equipment having mounting portions of different shapes, the motorized utility vehicle comprising:

a support frame;

a multi-purpose platform pivotally mounted to the support frame, the multi-purpose platform defining a plurality of regions, the multi-purpose platform having a plurality of different equipment mounts positioned at different ones of the regions of the multi-purpose platform, wherein:
(a) one of the equipment mounts has a shape defining at least one mounting point operable to connect said equipment mount to the mounting portion of one of the types of equipment; and
(b) another one of the equipment mounts has a different shape defining a plurality of mounting points operable to connect said other equipment mount to the mounting portion of another one of the types of equipment;
a platform lifting mechanism connected to the support frame and to the multi-purpose platform, wherein the platform lifting mechanism pivots the multi-purpose platform between a lower position and an upward position, exposing an engine area underneath the multi-purpose platform;
at least one control device supported by the support frame, the control device operatively coupled to the platform lifting mechanism, the control device operable to cause the platform lifting mechanism to move the multi-purpose platform between the lower position and the upward position; and
a platform securing latch connected to the multi-purpose platform and to the motorized vehicle.

11. The utility vehicle of claim 10, wherein the plurality of different equipment mounts further comprises a mount having a forward mount portion having first and second mounting points, and a rearward mount portion.

12. The utility vehicle of claim 11, wherein
the forward mount portion further comprises first and second U-shaped brackets, each U-shaped bracket having an open end facing upward and a removable pin extending from one leg to another leg of the U-shaped bracket, and
the rearward mount portion further comprises a bar removably latched to the multi-purpose platform.

13. The utility vehicle of claim 10, wherein the plurality of different types of equipment mounts include a mount selected from the group consisting of a tow hitch mount operable to couple the multi-purpose platform to towed equipment and a turf maintenance equipment mount operable to couple the multi-purpose platform to at least one type of turf maintenance equipment.

14. The utility vehicle of claim 13, wherein the multi-purpose platform further comprises a downward recessed portion having the tow hitch mount.

15. A method of operating a utility vehicle, comprising the steps of:
mounting a first type of equipment to a first equipment mount located on a first region of a multi-purpose platform of the utility vehicle;
dismounting the first type of equipment from the multi-purpose platform;
mounting a second type of equipment different from the first type of equipment to a second equipment mount located on a second region of the multi-purpose platform after the dismounting step, the second equipment mount shaped different than the first equipment mount;
enabling an operator to provide an input thereby causing the multi-purpose platform to automatically pivot to an upward position while one of the first and second types of equipment is mounted to the multi-purpose platform; and
causing the multi-purpose platform to remain in the upward position for a period of time, thereby enabling the operator to access a portion of the utility vehicle located below the multi-purpose platform.

16. The method of operating a utility vehicle of claim 15, wherein the step of pivoting the multi-purpose platform upward further comprises the step of hydraulically pivoting the multi-purpose platform upward.

17. A turf maintenance utility vehicle comprising:
a frame;
a front set of wheels rotatably coupled to the frame;
a rear set of wheels rotatably coupled to the frame;
an engine supported by the frame, the engine positioned between the front set of wheels and the rear set of wheels;
a hydraulic fluid system operatively coupled to the engine;
a multi-purpose platform pivotally coupled to the frame, the multi-purpose platform having a plurality of different types of turf maintenance equipment mounts operable to simultaneously mount a plurality of different types of turf maintenance equipment to the turf maintenance utility vehicle, the turf maintenance equipment mounts including:
(a) at least one tow hitch mount located at one region of the multi-purpose platform, the tow hitch mount defining a mount point operable to couple the multi-purpose platform to equipment which is pulled by the turf maintenance utility vehicle; and
(b) at least one different type of turf maintenance equipment mount located at another region of the multi-purpose platform, the different type of turf maintenance equipment mount defining a plurality of mount points operable to couple the multi-purpose platform to turf maintenance equipment which is carried on the multi-purpose platform;
at least one platform lifting mechanism having a first end and a second end, the first end operatively coupled to the frame and the second end operatively coupled to the multi-purpose platform, the platform lifting mechanism operatively coupled to the hydraulic fluid system; and
at least one control device operatively coupled to the hydraulic fluid system and further operatively coupled to the platform lifting mechanism, the control device operable to cause the platform lifting mechanism to pivot the multi-purpose platform between: (a) a first position where the multi-purpose platform covers at least a portion of the engine; and (b) a second position where said portion of the engine is exposed, said pivoting occurring while the equipment is carried on the multi-purpose platform.

18. The turf maintenance utility vehicle of claim 17, wherein the multi-purpose platform has an end or a side which is pivotally coupled to the support frame.

19. The motorized utility vehicle of claim 17, wherein at least one of the turf maintenance equipment mounts includes a sprayer mount.

20. The turf maintenance utility vehicle of claim 17, wherein the different type of turf maintenance equipment mount includes a spreader mount.

21. The motorized utility vehicle of claim 17, wherein at least one of the turf maintenance equipment mounts includes a vacuum device mount.

22. The turf maintenance utility vehicle of claim 17, wherein at least one of the turf maintenance equipment mounts includes a towing hitch.

23. The motorized utility vehicle of claim 17, wherein at least one of the turf maintenance equipment mounts includes a welder mount.

24. The motorized utility vehicle of claim 17, wherein at least one of the turf maintenance equipment mounts includes a generator mount.

25. The turf maintenance utility vehicle of claim 17, wherein the turf maintenance equipment carried on the multi-purpose platform includes equipment selected from the group consisting of spreader equipment, a spreader hopper and a dry material spreader.

26. The motorized utility vehicle of claim 17, wherein the turf maintenance equipment includes equipment selected from the group consisting of spraying equipment and a liquid sprayer.

27. The motorized utility vehicle of claim 17, wherein the turf maintenance equipment includes vacuuming equipment.

28. A motorized utility vehicle comprising:

a support frame;

an engine supported by the support frame;

a multi-purpose platform movably coupled to the support frame, the multi-purpose platform defining a plurality of regions, the multi-purpose platform having:

(a) a plurality of different equipment mounts so configured and arranged to removably mount different types of equipment to different ones of the regions of the multi-purpose platform, the equipment including turf maintenance equipment;

(b) a plurality of devices, each of the devices operatively coupled to at least one of the equipment mounts, each of the devices having a portion movable by hand of an operator between: (i) a first position causing a portion of one of the types of equipment to be mounted to the multi-purpose platform; and (ii) a second position causing said portion of said equipment to be dismounted from the multi-purpose platform;

(c) a first position wherein the multi-purpose platform covers a portion of the engine; and (d) a second position wherein said portion of the engine is exposed.

29. The motorized utility vehicle of claim 28, wherein the multi-purpose platform has an end or a side which is pivotally coupled to the support frame.

30. The motorized utility vehicle of claim 28, wherein at least one of the equipment mounts includes a sprayer mount.

31. The motorized utility vehicle of claim 28, wherein at least one of the equipment mounts includes a spreader mount.

32. The motorized utility vehicle of claim 28, wherein at least one of the equipment mounts includes a vacuum device mount.

33. The motorized utility vehicle of claim 28, wherein at least one of equipment mounts includes a towing hitch.

34. The motorized utility vehicle of claim 28, wherein at least one of the equipment mounts includes a welder mount.

35. The motorized utility vehicle of claim 28, wherein at least one of the equipment mounts includes a generator mount.

36. The motorized utility vehicle of claim 1, wherein the multi-purpose platform has a surface including a plurality of different regions, one of the equipment mounts located at one of the regions and another one of the equipment mounts located at another one of the regions, each of the equipment mounts defining at least one mounting point.

37. The motorized utility vehicle of claim 1, wherein at least one of the equipment mounts includes a mount selected from the group consisting of a tow hitch mount operable to couple the multi-purpose platform to equipment pulled by the motorized utility vehicle and a turf maintenance equipment mount operable to coupled the multi-purpose platform to at least one type of turf maintenance equipment carried on the multi-purpose platform.

* * * * *